(12) United States Patent
Suzuki et al.

(10) Patent No.: US 6,589,635 B2
(45) Date of Patent: Jul. 8, 2003

(54) INK-JET RECORDING MATERIAL AND INK-JET RECORDING METHOD

(75) Inventors: Yukihiro Suzuki, Tokyo (JP); Satoshi Kaneko, Tokyo (JP); Yukio Tokunaga, Tokyo (JP); Hiroyuki Onishi, Nagano-ken (JP); Masahiro Hanmura, Nagano-ken (JP); Hidemasa Kanada, Nagano-ken (JP)

(73) Assignee: Mitsubishi Paper Mills, Limited, Tokyo (JP)

( * ) Notice: Subject to any disclaimer, the term of this patent is extended or adjusted under 35 U.S.C. 154(b) by 27 days.

(21) Appl. No.: 09/816,409

(22) Filed: Mar. 26, 2001

(65) Prior Publication Data

US 2002/0008753 A1 Jan. 24, 2002

(30) Foreign Application Priority Data

| Mar. 28, 2000 | (JP) | 2000-089122 |
| Jul. 13, 2000 | (JP) | 2000-212562 |
| Dec. 18, 2000 | (JP) | 2000-383429 |

(51) Int. Cl.$^7$ ............... B32B 27/14; B32B 3/00
(52) U.S. Cl. ............ 428/195; 428/331; 524/609
(58) Field of Search ............... 428/195, 211, 428/212, 331, 342, 411.1, 537.5; 524/609

(56) References Cited

U.S. PATENT DOCUMENTS

| 5,729,266 A | * | 3/1998 | Malhotra | 347/102 |
| 5,985,424 A | * | 11/1999 | DeMatte et al. | 428/212 |
| 6,177,181 B1 | * | 1/2001 | Hamada et al. | 428/304.4 |

FOREIGN PATENT DOCUMENTS

| EP | 0701 902 A1 | 3/1996 |
| EP | 0 732 219 A2 | 9/1996 |
| EP | 0 888 904 A1 | 1/1999 |

OTHER PUBLICATIONS

Datasheet for AEROSIL MOX 170, Aerosil/Degussa website printed on Jun. 10, 2002.*

* cited by examiner

Primary Examiner—Cynthia H. Kelly
Assistant Examiner—B. Shewareged
(74) Attorney, Agent, or Firm—Paul E. White, Jr.; Manelli Denison & Selter PLLC

(57) ABSTRACT

An ink-jet recording material comprising a support, and an ink-receptive layer provided on the support, wherein said ink-receptive layer contains at least one thioether compound having an alkyl group substituted by a hydrophilic group or a group containing a basic nitrogen atom, and an ink-jet recording method which comprises at least the step of shooting liquid drops of an ink composition comprising at least a water-soluble dye, an organic solvent and water to an ink-jet recording material having an ink-receptive layer containing at least one thioether compound having an alkyl group substituted by a hydrophilic, group or a group containing a basic nitrogen atom, provided on a support.

8 Claims, No Drawings

INK-JET RECORDING MATERIAL AND INK-JET RECORDING METHOD

BACKGROUND OF THE INVENTION

1. Field of the Invention

The present invention relates to an ink-jet recording, particularly to an ink-jet recording material that has photo-like high glossiness, is excellent in ink-absorption property, and is improved in preservability after printing, and an ink-jet recording method.

2. Prior Art

An ink-jet recording method is a printing method in which fine drop of an ink composition is shot and attach to a recording medium such as paper, etc. to carry out printing. This method has characteristics that images of high resolution and high quality can be printed at a high speed, using a relatively cheap device. When a color image is printed by using an ink-jet recording system, it is general to use at least the three primary colors of yellow ink, magenta ink and cyan ink. There is another method in which finer image is obtained by using dense and pale inks having different densities of the magenta ink and the cyan ink, respectively. An ink composition generally used in the ink-jet recording usually comprises water as a main component as well as a coloring component and a wetting agent such as glycerin for preventing clogging, etc.

As ink used for ink-jet recording, it is necessary to have water resistance since if it does not have water resistance, there is a possibility that a coloring material is dissolved or dispersed again when the resulting image is contacted with water. To improve the water resistance, there has been known a method of adding a cationic type polymer as disclosed in, for example, Japanese Provisional Patent Publications No. 119280/1987, No. 296878/1990, No. 255876/1990, No. 188174/1991 and No. 305011/1995, etc. Also, the ink for ink-jet recording is required not only to be excellent in preservability of the coloring material in the ink but also to be excellent in preservability of the resulting image, such as light resistance and gas resistance. In particular, when a color image is printed, if any one of the plural colors is inferior in preservability, there is a problem that a color hue is changed and quality of the resulting color image is markedly deteriorated. Moreover, when a finer image is printed by using dense and pale inks, there is a problem that deterioration is remarkable at the image region at which the dense and pale inks are used. Thus, excellent preservability is highly required to a photo-like printed material or a printed material exposed to direct sunlight at the outdoors, etc.

On the other hand, as a recording material to be used for an ink-jet recording system, a recording material which comprises a porous ink-receptive layer comprising a pigment such as amorphous silica, and a water-soluble binder such as polyvinyl alcohol being provided on a support such as a usual paper or the so-called ink-jet recording sheet has generally been known.

There have been proposed recording sheets obtained by coating a silicon-containing pigment such as silica with a hydrophilic binder onto a paper support as disclosed in, for example, Japanese Provisional Patent Publications No. 51583/1980, No. 157/1981, No. 107879/1982, No. 107880/1982, No. 230787/1984, No. 160277/1987, No. 184879/1987, No. 183382/1987, No. 11877/1989, and the like.

Also, in Japanese Patent Publication No. 56552/1991, Japanese Provisional Patent Publications No. 188287/1990, No. 81064/1998, No. 119423/1998, No. 175365/1998, No. 193776/1998, No. 203006/1998, No. 217601/1998, No. 20300/1999, No. 20306/1999 and No. 34481/1999, U.S. Pat. No. 5,612,281, and EP 0 813 978 A, and the like, there,have been disclosed ink-jet recording materials using synthetic silica fine particles prepared by a gas phase process (hereinafter referred to as "fumed silica") The fumed silica is ultrafine particles having an average particle size of a primary particle of several nm to several tens nm, and has characteristics of giving high glossiness and high ink-absorption properties. In recent years, as a photo-like recording sheet has earnestly been desired, glossiness becomes more important. As such a recording material, there has been proposed a recording material in which an ink-receptive layer mainly comprising fumed silica is coated on a water-proof support such as a polyolefin resin-coated paper (a polyolefin resin such as polyethylene, etc. are laminated on the both surfaces of paper) or a polyester film, etc.

A conventional paper support which has generally been used, has a role of an ink-absorption layer by itself. However, unlike a paper support, the above-mentioned water resistant support such as a polyolefin resin-coated paper cannot absorb ink, so that ink absorption property of an c provided on the support is extremely important and a void ratio of the ink-receptive layer is required to be increased. Accordingly, it is necessary to increase an amount of the fumed silica to be coated and further to decrease a ratio of a binder to the fumed silica.

However, in the porous recording material using inorganic ultrafine particles such as the fumed silica, there is a problem that the printed image after printing is likely discolored during storage. That is, discoloration due to light or a small amount of a gas in air is likely caused. In particular, discoloration due to a small amount of a gas in air is a more significant problem.

SUMMARY OF THE INVENTION

Accordingly, an object,of the present invention is to provide an ink-jet recording material which is excellent in preservability of a printed part, and an ink-jet recording method, particularly, to provide an ink-jet recording material having a porous ink-receptive layer that has photo-like high glossiness and high ink-absorption capacity, and an ink-jet recording method using the same.

The above objects of the present invention can be accomplished by an ink-jet recording material which comprises a support, and an ink-receptive layer provided on the support, wherein said ink-receptive layer contains at least one thio-ether compound having an alkyl group substituted by a hydrophilic group or a group containing a basic-nitrogen atom.

Also, an ink-jet recording method of the present invention comprises at least the step of shooting liquid drops of an ink composition comprising at least a water-soluble dye, an organic solvent and water to an ink-jet recording material having an ink-receptive layer containing at least one thio-ether compound having an alkyl group substituted by a hydrophilic group or a group containing a basic nitrogen atom, provided on a support.

DESCRIPTION OF THE PREFERRED EMBODIMENTS

According to a preferred embodiment of the present invention, an ink-jet recording material comprising a support, and an ink-receptive layer containing inorganic fine particles provided on the support, wherein the ink-receptive layer contains at least one thioether compounds having an alkyl group substituted by a hydrophilic group or a group containing a basic nitrogen atom can be provided.

The thioether compound having an alkyl group substituted by a hydrophilic group or a group containing a basic nitrogen atom to be used in the present invention may include, for example, a compound represented by the following formula (I):

$$R^1\text{—}(S\text{—}R^3)_m\text{—}S\text{—}R^2 \tag{I}$$

wherein $R^1$ and $R^2$ may be the same or different from each other, each represents a hydrogen atom, a substituted or unsubstituted alkyl group, a substituted or unsubstituted aryl group or a group containing these alkyl group and the aryl group, or may form a ring by binding to each other, provided that at least one of $R^1$ and $R^2$ is an alkyl group substituted by a hydrophilic group such as a hydroxy group, a sulfo group, a carboxy group and a (poly)ethyleneoxy group, or a group containing a basic nitrogen atom such as an amino group, an amide group, an ammonium group, a nitrogen-containing heterocyclic group, an aminocarbonyl group and an aminosulfonyl group, or a group containing at least one of the above-mentioned these groups, and the substituted alkyl group may be bonded to the sulfur atom of the thioether through a divalent linking group such as a carbamoyl group, a carbonyl group, a carbonyloxy group, etc.; $R^3$ represents a substituted or unsubstituted alkylene group which may have an oxygen atom; and m is an integer of 0 to 10, and when m is 1 or more, at least one of the sulfur atom bonded to $R^3$ may be a sulfonyl group.

The above-mentioned thioether compound may be in the form of a salt such as a methanesulfonic acid salt, a p-toluenesulfonic acid salt, etc.

Particularly preferred compound represented by the formula (I) may include a compound wherein at least one of $R^1$ and $R^2$ is an alkyl group substituted by a hydroxy group, a carboxy group, an amino group or an ammonium group. As the amino group of the amino group-substituted alkyl group, there may be mentioned an amino group, a monoalkyl-substituted amino group (an alkyl group preferably being a $C_{1-5}$ alkyl), a dialkyl-substituted amino group (an alkyl preferably being a $C_{1-5}$ alkyl), etc., and it may be a nitrogen-containing heterocyclic group. In the following, specific examples of the compound represented by the formula (I) are mentioned but the present invention is not limited by these.

HO(CH$_2$)$_3$S(CH$_2$)$_3$OH (1)

CH$_3$SCH$_2$CHCOOH (2)
         |
         NH$_2$

 (3)

HO(CH$_2$)$_2$S(CH$_2$)$_2$OH (4)

CH$_3$S(CH$_2$)$_2$CH(NH$_2$)COOH (5)

HO(CH$_2$)$_2$SCH$_2$S(CH$_2$)$_2$OH (6)

HO(CH$_2$)$_2$S(CH$_2$)$_2$S(CH$_2$)$_2$OH (7)

HO(CH$_2$)$_2$S(CH$_2$)$_3$S(CH$_2$)$_2$OH (8)

C$_2$H$_5$S(CH$_2$)$_2$SCH$_2$CH(OH)CH$_2$OH (9)

HOOCCH$_2$SCH$_2$SCH$_2$COOH (10)

(CH$_2$)$_2$O(CH$_2$)$_2$ (11)
   /              \
  S                S
   \              /
   (CH$_2$)$_2$O(CH$_2$)$_2$

HO(CH$_2$)$_2$S(CH$_2$)$_2$SO$_2$(CH$_2$)$_2$S(CH$_2$)$_2$OH (12)

HO(CH$_2$)$_3$S(CH$_2$)$_2$S(CH$_2$)$_3$OH (13)

HOOCCH$_2$SCH$_2$COOH (14)

HOOCCH$_2$S(CH$_2$)$_3$SCH$_2$COOH (15)

HOOCCH$_2$S(CH$_2$)$_2$SCH$_2$COOH (16)

HO(CH$_2$)$_2$S(CH$_2$)$_4$SC(CH$_2$)$_2$OH (17)

HO(CH$_2$)$_2$S(CH$_2$)$_2$S(CH$_2$)$_2$S(CH$_2$)$_2$OH (18)

HOOC(CH$_2$)$_2$S(CH$_2$)$_2$S(CH$_2$)$_2$COOH (19)

HOOC(CH$_2$)$_2$S(CH$_2$)S(CH$_2$)$_2$COOH (20)

(HO(CH$_2$)$_2$S(CH$_2$)$_2$)$_2$O (21)

H$_2$NCO(CH$_2$)$_2$S(CH$_2$)$_2$S(CH$_2$)$_2$CONH$_2$ (22)

HOOC(CH$_2$)$_2$S(CH$_2$)$_2$COOH (23)

(HOCH$_2$CH(OH)CH$_2$SCH$_2$)$_2$ (24)

HOOC(CH$_2$)$_2$S(CH$_2$)$_3$S(CH$_2$)$_2$COOH (25)

C$_2$H$_5$S(CH$_2$)$_2$S(CH$_2$)$_2$NHCO(CH$_2$)$_2$COOH (26)

HO(CH$_2$)$_3$S(CH$_2$)$_2$O(CH$_2$)$_3$O(CH$_2$)$_2$S(CH$_2$)$_2$OH (27)

HO(CH$_2$)$_5$S(CH$_2$)$_5$S(CH$_2$)$_5$OH (28)

$$\begin{array}{c} CH_3 \\ \diagdown \\ \phantom{CH_3}N(CH_2)_2S(CH_2)_2N \\ \diagup \\ CH_3 \end{array} \begin{array}{c} CH_3 \\ \diagup \\ \\ \diagdown \\ CH_3 \end{array} \tag{29}$$

$$\begin{array}{c} CH_3 \\ \diagdown \\ \phantom{CH_3}N(CH_2)_2S(CH_2)_2S(CH_2)_2S(CH_2)_2N \\ \diagup \\ CH_3 \quad\quad\quad 2HCl \end{array} \begin{array}{c} CH_3 \\ \diagup \\ \\ \diagdown \\ CH_3 \end{array} \tag{30}$$

$$\begin{array}{c} CH_3 \\ \diagdown \\ \phantom{CH_3}N(CH_2)_2S(CH_2)_2S(CH_2)_2S(CH_2)_2S(CH_2)_2N \\ \diagup \\ CH_3 \quad\quad\quad\quad 2HCl \end{array} \begin{array}{c} CH_3 \\ \diagup \\ \\ \diagdown \\ CH_3 \end{array} \tag{31}$$

$$\begin{array}{c} CH_3 \\ \diagdown \\ \phantom{xx}N(CH_2)_2S(CH_2)_2S(CH_2)_2 \\ \diagup \\ CH_3 \\ \phantom{xxxxxxxxxxxxxxxxxxx}\diagdown \\ \phantom{xxxxxxxxxxxxxxxxxxxx}S \\ \phantom{xxxxxxxxxxxxxxxxxxx}\diagup \\ CH_3 \\ \diagdown \\ \phantom{xx}N(CH_2)_2S(CH_2)_2S(CH_2)_2 \\ \diagup \\ CH_3 \end{array} \tag{32}$$

$$\begin{array}{c} CH_3 \\ \diagdown \\ \phantom{CH_3}N(CH_2)_3S(CH_2)_2S(CH_2)_2S(CH_2)_3N \\ \diagup \\ CH_3 \quad\quad\quad 2HCl \end{array} \begin{array}{c} CH_3 \\ \diagup \\ \\ \diagdown \\ CH_3 \end{array} \tag{33}$$

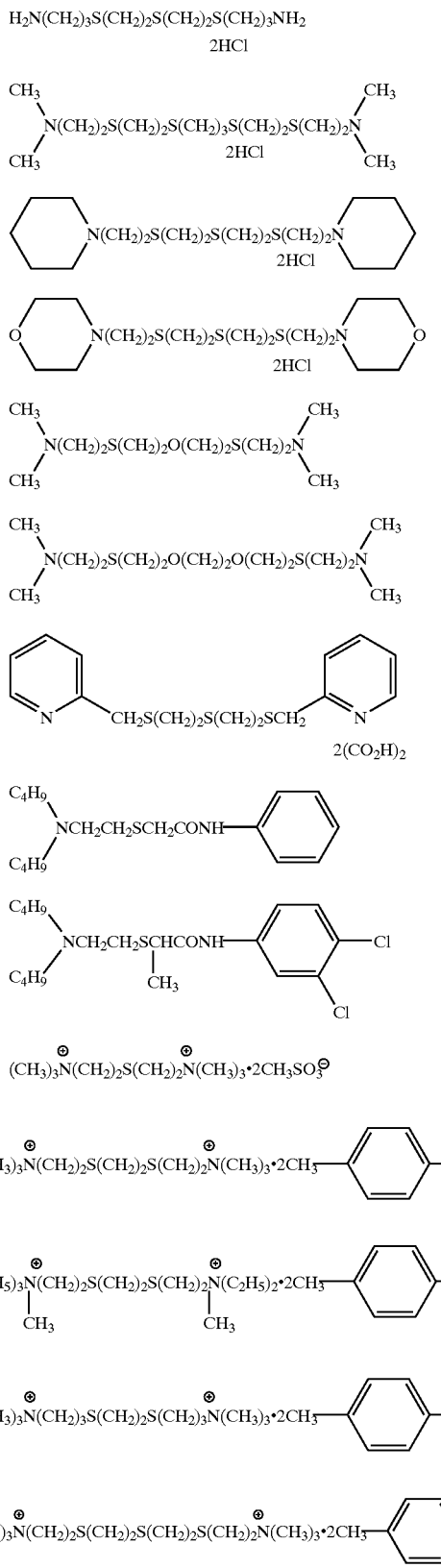

The preferred ink-jet recording material of the present invention is characterized in that it can absorb ink in voids in the film formed by inorganic particles, and in order to realize high ink-absorption capacity, it is necessary to increase a void volume. Therefore, it is necessary to coat a relatively large amount of the inorganic particles on the support, and when a hydrophilic binder is used, its amount is preferably reduced to increase the void ratio.

As the inorganic particles to be used in the present invention, various known particles can be mentioned, such as silica, alumina and the like, among which silica is especially preferred. An amount of the inorganic particles contained in the ink-receptive layer is preferably 8 g/m² or more, being more preferably in the range of about 10 to 30 g/m². If the amount is less than the above range, ink-absorption capacity is deteriorated. An amount of the hydrophilic binder is preferably in the range of 10 to 40% by weight. By decreasing the ratio of the hydrophilic binder as mentioned above, ink-absorption capacity is improved but preservability after printing, particularly gas resistance is likely to be deteriorated. These properties are simultaneously satisfied by the constitution of the present invention.

In the present invention, the inorganic particle is preferably contained in an ink-receptive layer as a main component, an amount of which is 50% by weight or more, more preferably about 60% by weight or more, further preferably about 65% by weight or more based on the total weight of the whole solid components in the ink-receptive layer.

In synthesized silica, there are two types of materials, one (precipitated silica) of which is prepared by the wet process and the other (fumed silica) is prepared by the gas phase process. As the silica prepared by the wet process, there are (1) a silica sol obtained by metathesis of sodium silicate by an acid or passing through an ion exchange resin layer; (2) a colloidal silica obtained by heating and maturing the silica sol of (1); (3) a silica gel obtained by gelling silica sol in which formation conditions thereof are changed whereby primary particles of a silica gel having a diameter of several microns to 10 microns are agglomerated to form three-dimensional secondary particles; and (4), a synthetic silicate compound mainly comprising silicic acid obtained by heating silica sol, sodium silicate, sodium aluminate, etc.

Fumed silica to be used in the present invention is also called to as the drying method silica, and the fumed silica can be generally prepared by a flame hydrolysis method. More specifically, it has been known a method in which silicon tetrachloride is burned with hydrogen and oxygen. In this method, silanes such as methyl trichlorosilane, trichlorosilane, etc., may be used alone in place of silicon tetrachloride or in combination with silicone tetrachloride. The fumed silica is commercially available from Nippon Aerosil K.K. (Japan) under the trade name of Aerosil, and K.K. Tokuyama (Japan) under the trade name of QS type, etc.

An average primary particle size of the fumed silica to be used in the present invention is less than 30 nm, and in order to obtain a higher gross, it is preferably less than 15 nm. Those having an average primary particle size of 3 to 15 nm and a specific surface area measured by the BET (Brunauer-Emmett-Teller) method of 200 m²/g or more is more preferably used. The BET method herein mentioned means one of methods for measuring a surface area of powder material by a gas phase adsorption method and is a method of obtaining a total surface area possessed by 1 g of a sample, i.e., a specific surface area, from an adsorption isotherm. As an adsorption gas, a nitrogen gas has frequently been used, and a method of measuring an adsorption amount obtained by the change in pressure or a volume of a gas to be adsorbed has most frequently been used. Most frequently used equation for representing isotherm of polymolecular adsorption is a Brunauer-Emmett-Teller equation which is also called to as a BET equation and has widely been used for determining a surface area of a substance to be examined. A specific surface area can be obtained by measuring an adsorption amount based on the BET equation and multiplying the amount with a surface area occupied by the surface of one adsorbed molecule.

In the present invention, as the hydrophilic binder to be preferably used with the inorganic particles, conventionally known various binders can be used, and a hydrophilic binder which has high transparency and gives high permeability is preferably used. For using the hydrophilic binder, it is important that the hydrophilic binder does not clog the voids by swelling at the initial stage of permeation of ink. From this point of view, a hydrophilic binder having a relatively low swellability at around the room temperature is preferably used. A particularly preferred hydrophilic binder is a completely or partially saponified polyvinyl alcohol or a cationic-modified polyvinyl alcohol.

Among the polyvinyl alcohols, particularly preferred is partially or completely saponified polyvinyl alcohol having a saponification degree of 80% or more. Those having an average polymerization degree of 200 to 5000 are preferred.

Also, as the cationic-modified polyvinyl alcohol, there may be mentioned, for example, a polyvinyl alcohol having a primary to tertiary amino groups or a quaternary ammonium group at the main chain or side chain of the polyvinyl.

In the present invention, it is preferred to use, in combination with the hydrophilic binder, a cross-linking agent (film hardening agent) of said binder. Specific examples of the cross-linking agent may include an aldehyde type compound such formaldehyde and glutaraldehyde; a ketone compound such as diacetyl and chloropentanedione; bis(2-chloroethylurea)-2-hydroxy-4,6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat. No. 3,017,280 and U.S. Pat. No. 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, zirconium sulfate, boric acid and a borate, and they may be used independently or in combination of two or more. Among these, boric acid and a borate are particularly preferred.

The present invention is to markedly improve preservability of an ink-jet recording material after printing by using the thioether compound having an alkyl group substituted by a hydrophilic group or a group having a basic nitrogen group in combination with inorganic fine particles, particularly fumed silica.

The above-mentioned thioether compound is contained in the ink-receptive layer in an amount of 0.1 to 50 mmol/m$^2$ more preferably 0.2 to 20 mmol/m$^2$.

The ink-receptive layer of the present invention preferably contains a cationic compound. By using the cationic compound in combination with the above-mentioned compound, preservability can be more improved.

As the cationic compound, there may be mentioned, for example, a cationic polymer and a water-soluble metallic compound. As the cationic polymer to be used in the present invention, there may be preferably mentioned polyethyleneimine, polydiallylamine, polyallylamine, polyalkylamine, as well as polymers having a primary to tertiary amino group or a quaternary ammonium group as disclosed in Japanese Provisional Patent Publications No. 20696/1984, No. 33176/1984, No. 33177/1984, No. 155088/1984, No. 11389/1985, No. 49990/1985, No. 83882/1985, No. 109894/1985, No. 198493/1987, No. 49478/1988, No. 115780/1988, No.280681/1988, No. 40371/1989, No. 234268/1994, No. 125411/1995 and No. 193776/1998, etc. An average molecular weight (Mw) of these cationic polymers is preferably 5,000 or more, more preferably in the range of 5,000 to 100,000.

An amount of these cationic polymers is preferably about 1% by weight to about 10% by weight, more preferably, about 2% by weight to about 7% by weight based on the amount of the inorganic fine particles.

The water-soluble metallic compound to be used in the present invention may include, for example, a water-soluble polyvalent metallic salt. As such a salt, there may be mentioned a water-soluble salt of a metal selected from the group consisting of calcium, barium, manganese, copper, cobalt, nickel, aluminum, iron, zinc, zirconium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, zirconium acetate, zirconium chloride, zirconium oxychloride octahydrate, zirconium hydroxychloride, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc.

In the present invention, a water-soluble aluminum compound or a water-soluble compound containing an element of Group 4A (Group 4) of the periodic table is particularly preferably used. The water-soluble aluminum compound may include, for example, aluminum chloride and its hydrate, aluminum sulfate and its hydrate, aluminum alum, etc. as an inorganic salt thereof. Moreover, there is a basic poly(aluminum hydroxide) compound which is an inorganic aluminum-containing cationic polymer. Of these, a basic poly(aluminum hydroxide) compound is particularly preferably used.

The above-mentioned poly(aluminum hydroxychloride) compound is a water-soluble poly(aluminum hydroxide) a main component of which is represented by the following formula (1), (2) or (3), and which contains a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

$[Al_2(OH)_nCl_{6-n}]_m$ (1)

$[Al(OH)_3]_nAlCl_3$ (2)

$$Al_n(OH)_mCl_{(3n-m)} \quad 0<m<3n \qquad (3)$$

These water-soluble aluminum compounds are commercially available from Taki Chemical, K.K., Japan under the trade name of poly(aluminum chloride) (PAC, trade name) as a water treatment agent, from Asada Chemical K.K., Japan under the trade name of poly(aluminum-hydroxide) (Paho, trade name), from K.K. Riken Green, Japan under the trade name of Pyurakemu WT (trade name) and other manufacturers with the same objects whereby various kinds of different grades can be easily obtained.

The water-soluble compound containing an element of Group 4 of the Periodic Table is not specifically limited so long as it is water-soluble, and a water-soluble compound containing titanium or zirconium is preferred. For example, as the water-soluble compound containing titanium, there may be mentioned titanium chloride and titanium sulfate, and as the water-soluble compound containing zirconium, there may be mentioned zirconium acetate, zirconium chloride, zirconium oxychloride, zirconium hydroxychloride, zirconium nitrate, basic zirconium carbonate, zirconium hydroxide, ammonium zirconium carbonate, potassium zirconium carbonate, zirconium sulfate, zirconium fluoride, and the like. Of these compounds, there is a compound having unsuitably low pH. In such a case, it may be used by optionally adjusting the pH of the compound. In the present invention, the term "water-soluble" means that the compound is dissolved in water in an amount of 1% by weight or more at normal temperature under normal pressure.

In the present invention, an amount of the above-mentioned water-soluble metallic compound is preferably about 0.1% by weight to 10% by weight more preferably about 1% by weight to about 5% by weight based on the amount of the inorganic fine particles.

The above-mentioned cationic compound may be used in combination of two or more compounds. For example, it is preferred to use the cationic polymer and the water-soluble metallic compound in combination.

In the present invention, the surface pH of the ink-receptive layer containing inorganic fine particles is preferably about 2 to about 6, particularly preferably about 3 to about 5. By using at least one of the compounds represented by the above-mentioned formula (I) in combination with the surface pH of the ink-receptive layer, preservability of the printed material after printing can be more improved. The surface pH of the ink-receptive layer is a surface pH obtained by dropping distilled water on the surface of the ink-receptive layer and measuring the pH at the distilled water portion after 30 seconds from dropping according to the method described in J. TAPPI paper pulp testing method No. 49.

The surface pH of the ink-receptive layer is preferably adjusted in the state of the coating solution, but the pH of the coating solution and the surface pH of the dried film are not necessarily accorded with each other. Thus, it is necessary to previously obtain the relationship between the pH of the coating solution and that of the dried film using the coating solution by experiments to make the surface pH predetermined value. The pH of the coating solution for forming the ink-receptive layer can be adjusted by suitably using an acid and/or an alkali. As the acid to be used, there may be mentioned an inorganic acid such as hydrochloric acid, nitric acid, sulfuric acid, phosphoric acid, etc., and an organic acid such as acetic acid, citric acid, succinic acid, etc. As the alkali, there may be used sodium hydroxide, aqueous ammonia, potassium carbonate, trisodium phosphate, and as a weak alkali, an alkali metal salt of a weak acid such as sodium acetate, etc.

The ink-receptive layer of the present invention may further contain various kinds of oil droplets to improve brittleness of a film. As such oil droplets, there may be mentioned a hydrophobic organic solvent having a high boiling (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxyethyl methacrylate, etc. is polymerized) each having a solubility in water at room temperature of 0.01% by weight or less. Such oil droplets can be used in an amount in the range of about 10 to about 50% by weight based on the amount of the hydrophilic binder.

In the present invention, a surfactant may be contained in the ink-receptive layer. The surfactant to be used may include either of an anionic, cationic, nonionic or betain type surfactant which may have a low molecular weight or a high molecular weight. At least one surfactant may be added to a coating solution for forming the ink-receptive layer. When two or more surfactants are used in combination, it is not preferred to use an anionic type together with a cationic type surfactant. An amount of the surfactant is preferably about 0.001 to about 5 g, more preferably about 0.01 to about 3 g per 100 g of the binder constituting the ink-receptive layer.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH buffer, etc. may be added.

A support to be used in the present invention is preferably a water resistant support. As the water resistant support to be used in the present invention, there may be mentioned, for example, a plastic resin film such as a polyester resin including polyethylene terephthalate; a diacetate resin; a triacetate resin; an acryl resin; a polycarbonate resin; a polyvinyl chloride; a polyimide resin; cellophane; celluloid; etc., a resin coated paper in which a polyolefin resin is laminated on the both surfaces of paper, and the like. A thickness of the water resistant support to be used in the present invention is preferably about 50 μm to about 300 μm.

A base paper constituting the resin-coated paper to be preferably used in the present invention is not particularly limited, and any paper generally used may be employed. More preferably a smooth base paper such as that used as a paper for a photographic support may be used. As pulp for constituting the base paper, natural pulp, regenerated pulp, synthetic pulp, etc. may be used singly or in combination of two or more. In the base paper, various additives conventionally used in the papermaking industry such as a sizing agent, a strengthening additive of paper, a loading material, an antistatic agent, a fluorescent brightener, a dye, etc. may be formulated.

Moreover, a surface sizing agent, a surface strengthening additive of paper, a fluorescent brightener, an antistatic agent, a dye, an anchoring agent, etc. may be coated on the surface of the sheet.

A thickness of the base paper is not particularly limited, and preferably that having a good surface smoothness prepared by compressing paper during paper-making or after paper-making by applying pressure using a calender, etc. A basis weight thereof is preferably 30 to 250 g/m².

As a resin of the resin-coated paper, a polyolefin resin or a resin which cures by irradiation of electronic rays may be used. The polyolefin resin may include a homopolymer of an olefin such as low density polyethylene, high density polyethylene, polypropylene, polybutene, polypentene, etc.; a copolymer comprising two or more olefins such as an ethylene-propylene copolymer, etc.; or a mixture thereof, and these polymers having various densities and melt viscosity indexes (melt index) may be used singly or in combination of two or more.

Also, to the resin of the resin-coated paper, various kinds of additives including a white pigment such as titanium oxide, zinc oxide, talc, calcium carbonate, etc.; an aliphatic amide such as stearic amide, arachidamide, etc.; an aliphatic acid metal salt such as zinc stearate, calcium stearate, aluminum stearate, magnesium stearate, etc.; an antioxidant such as Irganox 1010, Irganox 1076 (both trade names, available from Ciba Geigy AG), etc.; a blue-color pigment or dye such as cobalt blue, ultramarine blue, cecilian blue, phthalocyanine blue, etc,; a magenta-color pigment or dye such as cobalt violet, fast violet, manganese violet,. etc.; a fluorescent brightener, an UV absorber, etc. may be preferably added optionally combining two or more.

The resin-coated paper to be preferably used in the present invention can be prepared, in the case of using a polyolefin resin, by casting a melted resin under heating on a running base paper, which is so-called the extrusion coating method, whereby the both surfaces of the base paper are coated by the resin. In the case of using a resin which cures by irradiation of electronic rays, the resin is coated on a base paper by means of a coater conventionally used such as a gravure coater, a blade coater, etc., then, electronic rays are irradiated to the resin whereby coating the base paper with the resin. Also, it is preferred to subject an activation treatment to a base paper before coating the resin to the base paper, such as a corona discharge treatment, a flame treatment, etc. The surface (the front surface) on which an ink-receptive layer is to be coated of the support is a gloss surface or a matte surface depending on the purposes, and particularly, a gloss surface is predominantly used. It is not necessarily subjected to resin coating at the back surface of the base paper, but in view of preventing curl, it is preferred to coat the surface of the base paper with the resin. The back surface is usually a non-gloss surface, and if necessary, the activation treatment such as the corona discharge treatment, the flame treatment, etc. may be applied to the front surface or to the both surfaces of the front and back surfaces. Also, a thickness of the resin layer is not particularly limited, and is generally in the range of about 5 to about 50 μm on the front surface or both of the front and back surfaces.

To the support of the present invention, various kinds of back coating layer(s) may be provided for the purpose of providing antistatic property, conveying property, anticurl property, etc. to the support. In the back coating layer, an inorganic antistatic agent, an organic antistatic agent, a hydrophilic binder, a latex, a curing agent, a pigment, a surfactant, etc. may be included in optional combination.

In the present invention, the coating method of the ink-receptive layer is not particularly limited, and a coating method conventionally known in the art may be used. For example, there may be mentioned a slidelip system, a curtain system, an extrusion system, an air knife system, a roll coating system, a rod bar coating system, etc.

To the ink-jet recording material of the present invention, in addition to the layer containing fumed silica (this layer may comprise two or more layers), an ink-absorbing layer, an ink-fixing layer, an intermediate layer, a protective layer, etc., may be further provided. For example, a water-soluble polymer layer may be provided as an under layer or a swelling layer may be provided as an upper layer.

An ink composition to be suitably used in the ink-jet recording method of the present invention is explained in the following.

As a dye of the ink composition to be used in the ink-jet recording method of the present invention, there may be mentioned conventionally known dyes such as a substantive dye, an acidic dye, an edible dye, a basic dye, a reactive dye, a disperse dye, a vat dye, a soluble vat dye, a reactive disperse dye, an oil dye, etc., and any of these dyes may be used. Of these, the water-soluble dye is preferably used in the point of characteristics of the recording liquid.

Particularly preferred examples of the dye may include C.I. Direct Red-2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247; C.I. Direct Violet-7, 9, 47, 48, 51, 66, 90, 93, 94, 95, 35 98, 100 and 101; C.I. Direct Yellow-8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue-1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black-9, 17, 19, 22, 32, 51, 56, 62, 69, 77, 80, 91, 94, 97, 106, 154, 166, 168, 173 and 199; C.I. Acid Red-35, 42, 52, 57, 62, 80, 82, 111, 114, 118, 119, 127, 128, 131, 143, 151, 154, 158, 249, 254, 261, 263, 266, 289, 299, 301, 305, 336, 337:, 361, 396 and 397; C.I. Acid Violet-5, 34, 43, 47, 48, 90, 103 and 126; C.I. Acid Yellow-17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue-9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black-7, 24, 29, 48, 52:1 and 172-1; C.I. Reactive Red-3, 13, 17, 19, 21, 22, 23, 24, 29, 35, 37, 40, 41, 43, 45, 49 and 55; C.I. Reactive Violet-1, 3, 4, 5, 6, 7, 8, 9, 16, 17, 22, 23, 24, 26, 27, 33 and 34; C.I. Reactive Yellow-2, 3, 13, 14, 15, 17, 18, 23, 24, 25, 26, 27, 29, 35, 37, 41 and 42; C.I. Reactive Blue-2, 3, 5, 8, 10, 13, 14, 15, 17, 18, 19, 21, 23, 26, 27, 28, 29 and 38; C.I. Reactive Black-4, 5, 8, 14, 21, 23, 26, 31, 32 and 34; C.I. Basic Red-12, 13, 14, 15, 18, 22, 23, 24, 25, 27, 29, 35, 36, 38, 39, 45 and 46; C.I. Basic Violet-1, 2, 3, 7, 10, 15, 16, 20, 21, 25, 27, 28, 35, 37, 39, 40 and 48; C.I. Basic Yellow-1, 2, 4, 11, 13, 14, 15, 19, 21, 23, 24, 29, 32, 36, 39 and 40; C.I. Basic Blue-1, 3, 5, 7, 9, 22, 26, 41, 45, 46, 47, 54, 57, 60, 62, 65, 66, 69 and 71; C.I. Basic Black 8, and the like. As the copper phthalocyanine dye, there may be mentioned, for example, C.I. Direct Blue-86, 87 and 199, and the like.

Of these dyes, the substantive dye is relatively inferior in gas resistance, in particular, a copper phthalocyanine dye such s C.I. Direct Blue-199, etc., is inferior in gas resistance.

Thus, for carrying out the ink-jet recording method of the present invention, the gas resistant effect of the present invention can be markedly shown when recording is carried out by using at least one ink composition containing the substantive dye as a dye onto an ink-jet recording material in which a porous ink-receptive layer containing the thioether compound according to the present invention and inorganic fine particles is provided on a water resistant support.

An amount of these dyes to be added can be determined depending on the kind of dye, kind of a solvent component, characteristics required to ink, etc., and is generally preferably in the range of about 0.2 to about 15% by weight, more preferably about 0.5 to about 10% by weight based on the total weight of ink. When dense and pale inks are used, an amount of the dye is preferably in the range of about 1.0 to about 10% by weight based on the total weight of ink in the case of the dense ink and about 0.5 to about 3.0% by weight based on the total weight of ink in the case of the pale ink. In the ink-jet recording method of the present invention, when a recording image is formed by using the dense and pale inks, gas fading is likely caused at the image portion formed by the pale ink whereas its mechanism is uncertain. Thus, for carrying out the ink-jet recording method of the present invention, the gas resistant effect of the present invention can be markedly shown when recording is carried out by using the dense and pale inks onto an ink-jet recording material in which a porous ink-receptive layer containing the thioether compound according to the present invention and inorganic fine particles is provided on a water resistant support. The ink composition according to the embodiment of the present invention basically comprises a dye selected from the above-mentioned group of dyes, water and an organic solvent.

According to one of preferred embodiments of the present invention, a nitrogen-containing cyclic compound and a polyvalent alcohol are used as organic solvents in combination with the above-mentioned group of dyes. By adding the nitrogen-containing cyclic compound, dissolution of a dye can be stabilized and clogging of a nozzle can be prevented whereby printing can be carried out stably. Moreover, merits of supplementing coloration of a dye and improvement in water resistance of printed matter can be obtained. An amount of the nitrogen-containing cyclic compound to be added is preferably about 1 to about 30% by weight, more preferably about 3 to about 20% by weight based on the total amount of the ink composition. Specific examples of the nitrogen-containing compound may include 1,3-dimethyl-2-imidazolidinone, 2-pyrrolidone, N-methyl-2-pyrrolidone, $\epsilon$-caprolactam, and a mixture of the above-mentioned compounds. Also, by adding the polyvalent alcohol, amerit of effectively preventing clogging of a nozzle can be obtained. An amount of the polyvalent alcohol to be added is preferably about 1 to about 30% by weight, more preferably about 3 to about 20% by weight based on the total amount of the ink composition. Specific examples of the polyvalent alcohol may include ethylene glycol, diethylene glycol, triethylene glycol, polyethylene glycol, propylene glycol, 1,3-propane diol, 1,5-pentane diol, 1,2,6-hexane triol, glycerin, and a mixture of the above-mentioned compounds.

In the ink-jet recording method of the present invention, when the organic solvent is added to ink, gas fading likely proceeds at the mixed color (black, green and blue) portion whereas its mechanism is uncertain. Thus, for carrying out the ink-jet recording method of the present invention, the gas resistant effect of the present invention can be markedly shown when recording is carried out by using at least one ink composition containing a substantive dye and an organic solvent onto an ink-jet recording material in which a porous ink-receptive layer containing the thioether compound according to the present invention and inorganic fine particles is provided on a water resistant support.

According to one of preferred embodiments of the present invention, a nonionic acetylene glycol type surfactant is contained in the ink composition of the present invention. By adding the surfactant, merits of rapid fixing (permeability) of ink and keeping roundness of one dot can be obtained. As the examples of the specific nonionic acetylene glycol type surfactant to be used in the present invention, there may be mentioned, for example, Surfynol 465, Surfynol 104 (all trade names, available from Air Products Co., U.S.A.), Olfin STG (trade name, available from Nissin Chemical Co., Japan) and the like, and Olfin STG is particularly effective. An amount of the surfactant to be added is preferably about 0.05 to about 3% by weight, more preferably about 0.5 to about 2% by weight based on the total amount of the ink composition.

According to one of preferred embodiments of the present invention, glycol ether is contained in the ink composition of the present invention. By adding the glycol ether, permeability of the ink can be increased and bleed at the boundary of color inks adjacent to each other can be reduced when color printing is carried out so that extremely clear image can be obtained. As the glycol ether to be used in the present invention, there maybe mentioned, for example, ethylene glycol monobutyl ether, diethylene glycol monobutyl ether, tri-ethylene glycol monoethyl ether, propylene glycol monomethyl ether, dipropylene glycol monoethyl ether, propylene glycol monobutyl ether, dipropylene glycol monobutyl ether, tri-ethylene glycol monobutyl ether, etc. An amount of the glycol ether is preferably about 3 to about 30% by weight, more preferably about 5 to about 15% by weight based on the total amount of the ink composition.

According to one of preferred embodiments of the present invention, a pH of the ink composition is preferably adjusted by addition of a tri(hydroxyalkyl)amine. As a method of adjusting the pH, a method of using an inorganic base such as KOH, NaOH, etc., or a method of using an organic base such as an amine can be considered. When the inorganic base is used, it causes rapid increase in the pH at a certain added amount and control becomes sometimes difficult. Also, it is a solid material so that it precipitates in an ink composition whereby the inorganic base sometimes causes clogging of a nozzle. Moreover, the organic base involves a fear of reacting with a dye, etc., since a nitrogen atom of the amine charges positive charge. When either of the inorganic base or the organic base is used, it is necessary to not cause the above-mentioned problems. On the other hand, tri (hydroxyalkyl)amine seldom causes the above-mentioned problems so that it is preferably used. An amount of the tri(hydroxyalkyl)amine may be optionally determined in view of a desired pH and characteristics of the other ink composition, and is preferably about 0.1 to about 2% by weight, more preferably about 0.3 to about 1% by weight based on the total amount of the ink composition.

According to one of more preferred embodiments of the present invention, in addition to the above-mentioned tri (hydroxyalkyl)amine, at least one of ahydroxide of ametal atom selected from the group of Group-1 (or Group Ia) of the Periodic Table is contained in the ink composition. This hydroxide belongs to the above-mentioned inorganic base, and when it is used in combination with the tri (hydroxyalkyl)amine, clog-recovering property can be more improved. Moreover, as compared with the case where pH adjustment is carried out only by using the above-mentioned inorganic base, merits of causing less occurrence of precipitate and less change in a pH can be obtained. As the metal hydroxide, LiOH, NaOH, KOH, etc., are suitable since they are.high solubility in water. An amount of the metal hydroxide can be optionally determined in the range in which ink characteristics, particularly clog-recovering property are improved, and preferably about 0.01 to about 1% by weight based on the total weight of the ink composition. Moreover, to the ink composition of the present invention, a lower alcohol, a water-soluble polymer such as sodium alginate, etc., a water-soluble resin, a fluorine type surfactant, a mildewproofing agent, an anticorrosion agent, etc., may be added.

When the ink composition of the present invention is used in an ink-jet recording method, a viscosity of the ink composition is preferably about 30 mPa·s or less, more preferably in the range of about 1.2 to about 20 mPa·s at the operation temperature of 0 to 50° C. to realize good responsibility, shooting stability, suitable spread of dots and good roundness, etc. Also, a surface tension of the ink composition is preferably about 20 to about 35 mN/m at the operation temperature of 0 to 50° C.

EXAMPLES

In the following, the present invention is explained in more detail by referring to Examples, but the present invention is not limited by these Examples.

Example 1

On the front surface of a base paper comprising a pulp formulation of a bleached kraft pulp of hardwood (LBKP, 50 parts) and a bleached sulfite pulp of hardwood (LBSP, 50 parts) with 120 g/m² as a support was coated a resin composition comprising a low density polyethylene (70 parts), a high density polyethylene (20 parts): and titanium oxide (10 parts) in an amount of 25 g/m², and a resin composition comprising a high density polyethylene (50 parts) and a low density polyethylene (50 parts) was coated on the back surface of the same in an amount of 25 g/m² to prepare a resin coated paper.

On the above-mentioned support was coated the following coating solution for an ink-receptive layer so that the coated amount of the fumed silica was 18 g/m² and dried to prepare various kinds of ink-jet recording sheets. Incidentally, every recording sheet was so adjusted that the surface pH of the ink-receptive layer became 4.2.

<Recording Sheet 1>
Fumed silica 100 parts
 (Average primary particle size: 7 nm, Specific surface area by the BET method: 300 m²/g)
Polyvinyl alcohol 25 parts
 (PVA235, trade name, available from K.K. Kuraray, Japan, Saponification degree: 88%, Average polymerization degree: 3,500)
Boric acid 4 parts
Amphoteric surfactant 0.3 part
 (SWAM AM-2150, trade name, available from Nippon Surfactant, Japan)

<Recording Sheet 2>
To the ink-receptive layer of the above-mentioned Recording sheet 1, the following compound represented by the formula (a) was added so that it was contained in an amount of 5 mmol/m².

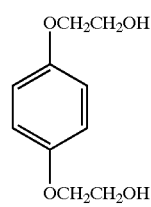

(a)

<Recording Sheet 3>
To the ink-receptive layer of the above-mentioned Recording sheet 1, the following compound represented by the formula (b) was added so that it was contained in an amount of 5 mmol/m².

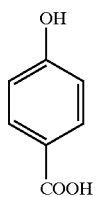

(b)

<Recording Sheet 4>
To the ink-receptive layer of the above-mentioned Recording sheet 1, the following compound represented by the formula (c) was added so that it was contained in an amount of 5 mmol/m².

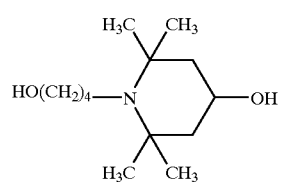

(c)

<Recording Sheet 5>
To the ink-receptive layer of the above-mentioned Recording sheet 1, the following compound represented by the formula (d) was added so that it was contained in an amount of 5 mmol/m².

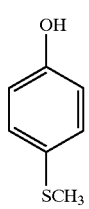

(d)

<Recording Sheet 6>
To the ink-receptive layer of the above-mentioned Recording sheet 1, the compound of the formula (4) of the present invention was added so that it was contained in an amount of 5 mmol/m².

<Recording Sheet 7>
To the ink-receptive layer of the above-mentioned Recording sheet 1, the compound of the formula (7) of the present invention was added so that it was contained in an amount of 5 mmol/m².

<Recording Sheet 8>
To the ink-receptive layer of the above-mentioned Recording sheet 1, the compound of the formula (12) of the present invention was added so that it was contained in an amount of 5 mmol/m².

<Recording Sheet 9>
To the ink-receptive layer of the above-mentioned Recording sheet 1, the compound of the formula (14) of the present invention was added so-that it was contained in an amount of 5 mmol/m².

<Recording Sheet 10>
To the ink-receptive layer of the above-mentioned Recording sheet 1, the compound of the formula (24) of the present invention was added so that it was contained in an amount of 5 mmol/m².

<Recording Sheet 11>

To the ink-receptive layer of the above-mentioned Recording sheet 1, the compound of the formula (30) of the present invention was added so that it was contained in an amount of 5 mmol/m$^2$.

<Recording Sheet 12>

To the ink-receptive layer of the above-mentioned Recording sheet 1, the compound of the formula (36) of the present invention was added so that it was contained in an amount of 5 mmol/m$^2$.

<Recording Sheet 13>

To the ink-receptive layer of the above-mentioned Recording sheet 1, the compound o:f the formula (40) of the present invention was added so that it was contained in an amount of 5 mmol/m$^2$.

<Recording Sheet 14>

To the ink-receptive layer of the above-mentioned Recording sheet 1, the compound of the formula (44) of the present invention was added so that it was contained in an amount of 5 mmol/m$^2$.

<Recording Sheet 15>

To the ink-receptive layer of the above-mentioned Recording sheet 1, the compound of the formula (47) of the present invention was added so that it was contained in an amount of 5 mmol/m$^2$.

With regard to the respective ink-jet recording sheets thus obtained, ink-absorption property, preservability (light resistance and gas resistance) after printing, and glossiness were evaluated by using a six-colored type ink-jet printer (PM-770C, trade name, available from Seiko Epson K.K., Japan) using the following dense and pale inks. The results are shown in Table 1.

<Ink-absorption Property>

C (cyan), M (magenta) and Y (yellow) were each printed with 100%, and immediately after the printing, a PPC paper was overlapped over the printed portion with a slight pressurization, and the degree of an amount of the ink transferred to the PPC paper was observed with naked eyes and evaluated by the following standards.

○: No transfer was observed.

X: Transfer was occurred.

<Gas Resistance>

Printing was carried, so that the density at the printed portion becomes 1.0, using a cyan ink having the most noticeable color fade. After exposing the material in air at room temperature for 3 months, the density at the printed portion was measured. The image remaining ratio (density after exposure/density before exposure) was obtained, and the results are shown in Table 1.

<Light Resistance>

Printing was carried out so that the density of the printed portion becomes 1.0, followed by irradiating light of 60 W/m$^2$ to the printed materials for 30 hours by Sun Test CPS light-fading test machine (trade name) manufactured by Atlas K.K., Japan. Thereafter, the density at the printed portion was measured and the image remaining ratio (density after irradiation/density before irradiation) was obtained. The results are shown in Table 1.

<Glossiness>

Glossiness was measured according to the method described in JIS P-8142 (Testing method for 750 specular glossiness of paper and board).

The compositions of the dense and pale inks to be used are as mentioned below.

(Cyan ink)

| | |
|---|---|
| Direct Blue 199 | 2.4 g |
| Ethylene glycol | 16.01 g |
| Glycerin | 9.5 g |
| Made up to 100 ml with pure water. | |

(Magenta ink)

| | |
|---|---|
| Direct Red 227 | 1.8 g |
| Glycerin | 3.5 g |
| Diethylene glycol monobutyl ether | 21.5 g |
| Made up to 100 ml with pure water. | |

(Yellow ink)

| | |
|---|---|
| Direct Yellow 86 | 2.0 g |
| Diethylene glycol | 22.2 g |
| Glycerin | 4.5 g |
| Made up to 100 ml with pure water. | |

(Light Cyan ink)

| | |
|---|---|
| Direct Blue 199 | 0.6 g |
| Ethylene glycol | 16.01 g |
| Glycerin | 9.5 g |
| Made up to 100 ml with pure water. | |

(Light Magenta ink)

| | |
|---|---|
| Direct Red 227 | 0.5 g |
| Glycerin | 3.5 g |
| Diethylene glycol monobutyl ether | 21.5 g |
| Made up to 100 ml with pure water. | |

TABLE 1

| Recording sheet | Ink-absorption property | Preservability Light resistance | Gas resistance | Remarks |
|---|---|---|---|---|
| 1 | ○ | 71 | 72 | Comparative |
| 2 | ○ | 80 | 73 | Comparative |
| 3 | ○ | 79 | 74 | Comparative |
| 4 | ○ | 78 | 74 | Comparative |
| 5 | ○ | 75 | 77 | Comparative |
| 6 | ○ | 81 | 89 | This invention |
| 7 | ○ | 85 | 94 | This invention |
| 8 | ○ | 83 | 91 | This invention |
| 9 | ○ | 85 | 93 | This invention |
| 10 | ○ | 83 | 93 | This invention |
| 11 | ○ | 84 | 92 | This invention |
| 12 | ○ | 85 | 93 | This invention |
| 13 | ○ | 84 | 92 | This invention |
| 14 | ○ | 86 | 94 | This invention |
| 15 | ○ | 85 | 92 | This invention |

Glossiness was 60 to 65% in each recording sheet and high glossiness was shown.

Example 2

With regard to the recording sheets 1 to 15 prepared in Example 1, ink-absorption property, preservability (light resistance and gas resistance) after printing, and glossiness were evaluated by using a four-colored system ink-jet printer (manufactured by Seiko Epson K.K., Japan, EM-900C, trade name) using the dense inks as mentioned below. The results are shown in Table 2.

(Cyan ink)

| | |
|---|---|
| Direct Blue 199 | 2.4 g |
| Ethylene glycol | 16.01 g |
| Glycerin | 9.5 g |
| Made up to 100 ml with pure water. | |

(Magenta ink)

| | |
|---|---|
| Direct Red 227 | 1.8 g |
| Glycerin | 3.5 g |
| Diethylene glycol monobutyl ether | 21.5 g |
| Made up to 100 ml with pure water. | |

(Yellow ink)

| | |
|---|---|
| Direct Yellow 86 | 2.0 g |
| Diethylene glycol | 22.2 g |
| Glycerin | 4.5 g |
| Made up to 100 ml with pure water. | |

TABLE 2

| Recording sheet | Ink-absorption property | Preservability Light resistance | Gas resistance | Remarks |
|---|---|---|---|---|
| 1 | ○ | 76 | 80 | Comparative |
| 2 | ○ | 82 | 81 | Comparative |
| 3 | ○ | 83 | 82 | Comparative |
| 4 | ○ | 81 | 82 | Comparative |
| 5 | ○ | 79 | 84 | Comparative |
| 6 | ○ | 85 | 91 | This invention |
| 7 | ○ | 89 | 95 | This invention |
| 8 | ○ | 86 | 93 | This invention |
| 9 | ○ | 88 | 95 | This invention |
| 10 | ○ | 87 | 96 | This invention |
| 11 | ○ | 89 | 95 | This invention |
| 12 | ○ | 89 | 95 | This invention |
| 13 | ○ | 87 | 95 | This invention |
| 14 | ○ | 90 | 95 | This invention |
| 15 | ○ | 88 | 93 | This invention |

Glossiness was 60 to 65% in each recording sheet and high glossiness was shown.

As can clearly seen from the results shown in Tables 1 and 2, by using the thioether compound of the present invention, preservability can be improved while maintaining high ink absorption property. In particular, when dense and pale inks are employed, improved effects in preservability can be markedly obtained. That is, in the present invention, the ink absorption property and preservability are simultaneously improved and a photo-like high glossiness can be obtained.

Example 3

The same tests were carried out as in Example 1 except for changing fumed silica,used in Example 1 to those having an average primary particle size of 15 nm. As a result, substantially the same results could be obtained with regard to ink absorption property and preservability, but glossiness was lowered with the degree of 3 to 6%.

Example 4

Recording sheets 6A to 15A were prepared by further adding each 3 parts of diallylamine hydrochloride-sulfur dioxide copolymerized product (PAS-92, trade name, available from Nittobo K.K., Japan) and basic poly(aluminum hydroxide) (Pyurakemu WT, trade name, available from Riken Green K.K., Japan) to the recording sheets 6 to 15 of the present invention prepared in Example 1, respectively. These recording sheets were examined in the same manner as in Example 1. The results are shown in Table 3.

TABLE 3

| Recording sheet | Ink-absorption property | Preservability Light resistance | Gas resistance |
|---|---|---|---|
| 6A | ○ | 90 | 91 |
| 7A | ○ | 93 | 97 |
| 8A | ○ | 91 | 94 |
| 9A | ○ | 93 | 97 |
| 10A | ○ | 93 | 97 |
| 11A | ○ | 93 | 94 |
| 12A | ○ | 94 | 95 |
| 13A | ○ | 94 | 95 |
| 14A | ○ | 93 | 96 |
| 15A | ○ | 93 | 96 |

Glossiness was 60 to 65% in each recording sheet and high glossiness was shown.

As can be seen from the above results, by using the thioether compound of the present invention in combination with the cationic compound, preservability can be more improved.

According to the present invention, a photo-like ink-jet recording material having high ink absorption property and high glossiness, and improved in preservability can be obtained.

What is claimed is:

1. An ink-jet recording material comprising a support, and an ink-receptive layer provided on the support, wherein said ink-receptive layer contains at least one thioether compound having an alkyl group substituted by a hydrophilic group or a group containing a basic nitrogen atom.

2. The ink-jet recording material according to claim 1, wherein the ink-receptive layer contains inorganic particles.

3. The ink-jet recording material according to claim 1, wherein the inorganic particles are fumed silica having an average particle size of primary particles of 3 to 30 nm.

4. The ink-jet recording material according to claim 3, wherein a hydrophilic binder is contained in an amount of 10 to 40% by weight based on the amount of the inorganic particles.

5. The ink-jet recording material according to claim 1, wherein the ink-receptive layer is cross-linked by a crosslinking agent.

6. The ink-jet recording material according to claim 1, wherein the ink-receptive layer further contains a cationic compound.

7. The ink-jet recording material according to claim 1, wherein the support is a water resistant support.

8. The ink-jet recording material according to claim 1, wherein the thioether compound is represented by the formula (I):

$$R^1-(S-R^3)_m-S-R^2 \quad (I)$$

wherein $R^1$ and $R^2$ may be the same or different from each other and each represent a hydrogen atom, a substituted or unsubstituted alkyl group, a substituted or unsubstituted aryl group or a group containing these alkyl group and the aryl group, or may form a ring by binding to each other, provided that at least one of $R^1$ and $R^2$ is an alkyl group substituted by a hydrophilic group selected from a hydroxy group, a sulfo group, a carboxy group and a (poly)ethyleneoxy group, and a group containing a basic nitrogen atom selected from an amino group, an amide group, an ammonium group, a nitrogen-containing heterocyclic group, an aminocarbonyl group and an aminosulfonyl group, or a group containing at least one of the above-mentioned these groups, and the substituted alkyl group may be bonded to the sulfur atom of the thioether through a divalent linking group; $R^3$ represents a substituted or unsubstituted alkylene group which may have an oxygen atom; and m is an integer of 0 to 10, and when m is 1 or more, at least one of the sulfur atom bonded to $R^3$ may be a sulfonyl group.

* * * * *